(12) United States Patent
Kim (10) Patent No.: US 12,082,671 B2
(45) Date of Patent: Sep. 10, 2024

(54) CARRIER ALSO USABLE AS WAGON

(71) Applicant: LALA CO., LTD., Guri-si (KR)

(72) Inventor: Sun Hee Kim, Guri-si (KR)

( * ) Notice: Subject to any disclaimer, the term of this patent is extended or adjusted under 35 U.S.C. 154(b) by 53 days.

(21) Appl. No.: 18/005,878

(22) PCT Filed: Oct. 1, 2021

(86) PCT No.: PCT/KR2021/013503
§ 371 (c)(1),
(2) Date: Jan. 18, 2023

(87) PCT Pub. No.: WO2022/092598
PCT Pub. Date: May 5, 2022

(65) Prior Publication Data
US 2023/0270217 A1  Aug. 31, 2023

(30) Foreign Application Priority Data

Oct. 30, 2020  (KR) .......................... 10-2020-0143520

(51) Int. Cl.
*A45C 7/00* (2006.01)
*A45C 5/14* (2006.01)
*A45C 13/04* (2006.01)
*A45C 13/26* (2006.01)

(52) U.S. Cl.
CPC ............ *A45C 7/0022* (2013.01); *A45C 5/146* (2013.01); *A45C 13/04* (2013.01); *A45C 13/262* (2013.01); *A45C 2005/148* (2013.01); *A45C 2013/267* (2013.01)

(58) Field of Classification Search
CPC ....... A45C 7/0022; A45C 7/146; A45C 13/04; A45C 13/262; A45C 2005/148; A45C 2013/267
See application file for complete search history.

(56) References Cited

U.S. PATENT DOCUMENTS

| 3,842,953 A | * | 10/1974 | Royet | A45C 5/146 190/18 A |
| 4,087,102 A | * | 5/1978 | Sprague | A45C 5/146 280/37 |
| 4,314,624 A | * | 2/1982 | Royet | A45C 5/146 280/646 |
| 5,285,656 A | * | 2/1994 | Peters | A45C 5/14 220/666 |

(Continued)

*Primary Examiner* — Tri M Mai
(74) *Attorney, Agent, or Firm* — KORUS Patent, LLC; Seong Il Jeong (57) ABSTRACT

The present invention is directed to a suitcase which is made of a metal material such as aluminum or made of synthetic resin or fabric, is formed in a quadrangular shape, and is provided with a zipper or one-touch locking device along a center thereof so that a suitcase body can be selectively opened and closed, and in which a handle is installed to be retractable on the top surface of the suitcase body, wherein an auxiliary moving means configured such that auxiliary casters are rotated and deployed by the extension of a handle is installed on the suitcase body so that the suitcase body can be laid down and moved, and a loading guide is installed to be foldable on the suitcase body so that a load can be loaded thereonto in the state where the suitcase body is laid down.

6 Claims, 8 Drawing Sheets

(56) References Cited

U.S. PATENT DOCUMENTS

| | | | | |
|---|---|---|---|---|
| 5,566,797 | A * | 10/1996 | Van Himbeeck | A45C 3/004 190/102 |
| 8,118,145 | B1 * | 2/2012 | Hamamy | A45C 5/146 280/30 |
| 8,256,591 | B2 * | 9/2012 | Majeau | A45C 13/262 190/115 |
| 9,629,429 | B2 * | 4/2017 | Green | A45C 5/146 |
| 9,764,751 | B2 * | 9/2017 | Cho | A63B 55/30 |
| 10,272,934 | B2 * | 4/2019 | DeFrancia | B62B 1/12 |
| 11,109,657 | B2 * | 9/2021 | Correll | A45C 13/385 |
| 2004/0000457 | A1 * | 1/2004 | Sanford-Schwentke | A45C 5/146 280/655 |

* cited by examiner

CARRIER ALSO USABLE AS WAGON

TECHNICAL FIELD

The present invention relates to a suitcase also usable as a wagon, and more particularly to a suitcase also usable as a wagon that can be used as a travel suitcase and that allows a loading guide to be folded when there are a lot of loads so that a load can be loaded onto the loading guide and also allows the suitcase to be moved by allowing the suitcase to be laid down.

BACKGROUND ART

In general, hand suitcases are designed to conveniently store and move items such as clothing or accessories during travel, immigration, or long-time business trips.

In general, such a suitcase is made of a metal material such as aluminum or made of synthetic resin or cloth, at least two castors are installed on the bottom surface of the suitcase, and a handle for movement is installed on the top surface of the suitcase to be retractable.

In addition, a handle that the user can hold and lift by hand is installed at the center of the top surface of such a suitcase. The moving handle installed in the suitcase to be retractable is composed of a pair of handle frames configured to be retractable into the suitcase, and a grip portion configured to be held by a user by hand while connecting the pair of handle frames.

The suitcase configured as described above is convenient for carrying a load during travel, but has a problem in that it is inconvenient to carry heavy objects such as children or other loads on the suitcase.

In addition, the suitcase cannot be transformed into a wagon form according to the state of the load, so that there is an inconvenience in that the load must be stored in a limited space.

As a prior art for mitigating these inconveniences, there is disclosed Korean Patent No. 10-1890285 (registered on Aug. 14, 2018) entitled "Suitcase Capable of Being Transformed into Wagon Form."

The suitcase capable of being transformed into a wagon form includes: a housing body equipped with suitcase castors on the bottom thereof and configured to allow the front thereof to be opened; a wagon front castor unit including one or more wagon castors, provided on one side of the rear surface of the housing body, and configured to be foldable in the direction of the storage space of the housing body; a wagon rear castor unit including one or more wagon castors, provided on the other side of the rear surface of the housing body, and configured to be foldable in the direction of the storage space of the housing body; and a suitcase handle provided on the rear surface of the housing body, wherein it is characterized in that, when the wagon front castor unit and the wagon rear castor unit are unfolded after the opening of the front of the housing body, the suitcase is transformed into a baby wagon, the housing body is configured to be expandable in the height direction thereof, and the housing body handle includes a frame part hinged to the rear surface of the housing body at one end thereof and a multi-stage stick part hinged to the other end of the frame part at one end thereof.

The prior art configured as described above has a problem in which a wagon and a suitcase cannot be used at the same time. In other words, it can be used only in the form of a suitcase or a wagon, so that there is a problem in that a separate load cannot be loaded onto the wagon in the state in which a load is stored inside the suitcase as needed during travel.

DISCLOSURE

Technical Problem

The present invention is intended to solve the above-described problems, and an object of the present invention is to provide a suitcase also usable as a wagon that can be used as a travel suitcase and that allows a loading guide to be folded when there are a lot of loads so that a load can be loaded onto the loading guide and also allows the suitcase to be moved by allowing the suitcase to be laid down.

In addition, an object of the present invention is to provide a suitcase also usable as a wagon that can be easily moved in the state in which a suitcase body is laid down in such a manner that, when a handle is completely extended, auxiliary castors are protruded, thereby allowing the angle of the handle to be adjusted.

Technical Solution

As a means for solving the above problems, the present invention provides a suitcase which is made of a metal material such as aluminum or made of synthetic resin or fabric, is formed in a quadrangular shape, and is provided with a zipper or one-touch locking device along the center thereof so that a suitcase body can be selectively opened and closed, and in which a handle is installed to be retractable on the top surface of the suitcase body, wherein an auxiliary moving means configured such that auxiliary casters are rotated and deployed by the extension of a handle is installed on the suitcase body so that the suitcase body can be laid down and moved, and a loading guide is installed to be foldable on the suitcase body so that a load can be loaded thereonto in the state where the suitcase body is laid down.

In the suitcase body of the present invention: a base panel is provided with support ribs, the handle is installed on the base panel to be selectively retracted and extended, a caster entry/exit member is installed on the handle, a cover panel is installed on one side of the base panel, and the auxiliary casters is configured to be selectively retracted into and deployed out of the base panel.

The castor entry/exit member of the present invention allows the auxiliary castors to selectively enter and exit the cover panel by rotating the auxiliary castors as the handle selectively enters and exits between the base panel and the cover panel.

The castor entry/exit member of the present invention includes: a direction-changing body installed at the lower end of the handle; and a direction-changing depression formed in the direction-changing body in a spiral shape.

The handle of the present invention is formed to have multiple stages so that the length thereof can be adjusted, and hinge shafts are installed on the lower sides of the handle to enable angle adjustment.

The auxiliary castor of the present invention includes: a wheel coupling member formed in a '∩' shape so that a wheel can be coupled thereto, and having a spring installation depression and a second spring support depression formed therein; the wheel rotatably installed on the wheel coupling member; a direction-changing protrusion coupled to the direction-changing depression formed in a spiral shape in the castor entry/exit member, and configured to change the direction of the auxiliary castor; a rotating shaft coupled to the coupling depression formed opposite to the castor entry/exit depression, and formed in the wheel coupling member so that the auxiliary castor can be rotated by 90°; and the torsion spring coupled to the rotating shaft so that sides thereof are supported by a first spring support depression and the second spring support depression. The loading guide of the present invention includes: a guide frame installed on one side of the suitcase body; and front, rear, and side panels installed to be foldable on the front, rear and sides of the guide frame.

Advantageous Effects

The present invention has an effect in which the suitcase also usable as a wagon can be used as a travel suitcase, and, when there are a lot of loads, the handle is completely extended and the auxiliary castors retracted into the cover panel are deployed such that the suitcase can be moved by laying it down, and then the loading guide is set up to form a space inside so that the load can be conveniently loaded and then carried.

In addition, the present invention has an effect in which when the handle is completely extended, the auxiliary castors are protruded, and thus the angle of the handle is adjusted, so that the suitcase body can be easily moved in the state of being laid down.

BEST MODE

A suitcase according to the present invention which is made of a metal material such as aluminum, or made of synthetic resin or fabric, is formed in a quadrangular shape, and is provided with a zipper or one-touch locking device along the center thereof so that a suitcase body (100) can be selectively opened and closed, and in which a handle is installed to be retractable on the top surface of the suitcase body, wherein an auxiliary moving means (200) configured such that auxiliary casters (250) are rotated and deployed by the extension of a handle (220) is installed on the suitcase body (100) so that the suitcase body (100) can be laid down and moved; and wherein a loading guide (300) is installed to be foldable on the suitcase body (100) so that a load can be loaded thereonto in the state where the suitcase body (100) is laid down.

MODE FOR INVENTION

A suitcase also usable as a wagon according to the present invention will be described below.

The suitcase also usable as a wagon according to the present invention will be described in detail with reference to the accompanying drawings.

Referring to FIGS. 1 to 7, the suitcase also usable as a wagon according to the present invention includes a suitcase body 100, an auxiliary moving means 200, and a loading guide 300.

Figure 1:
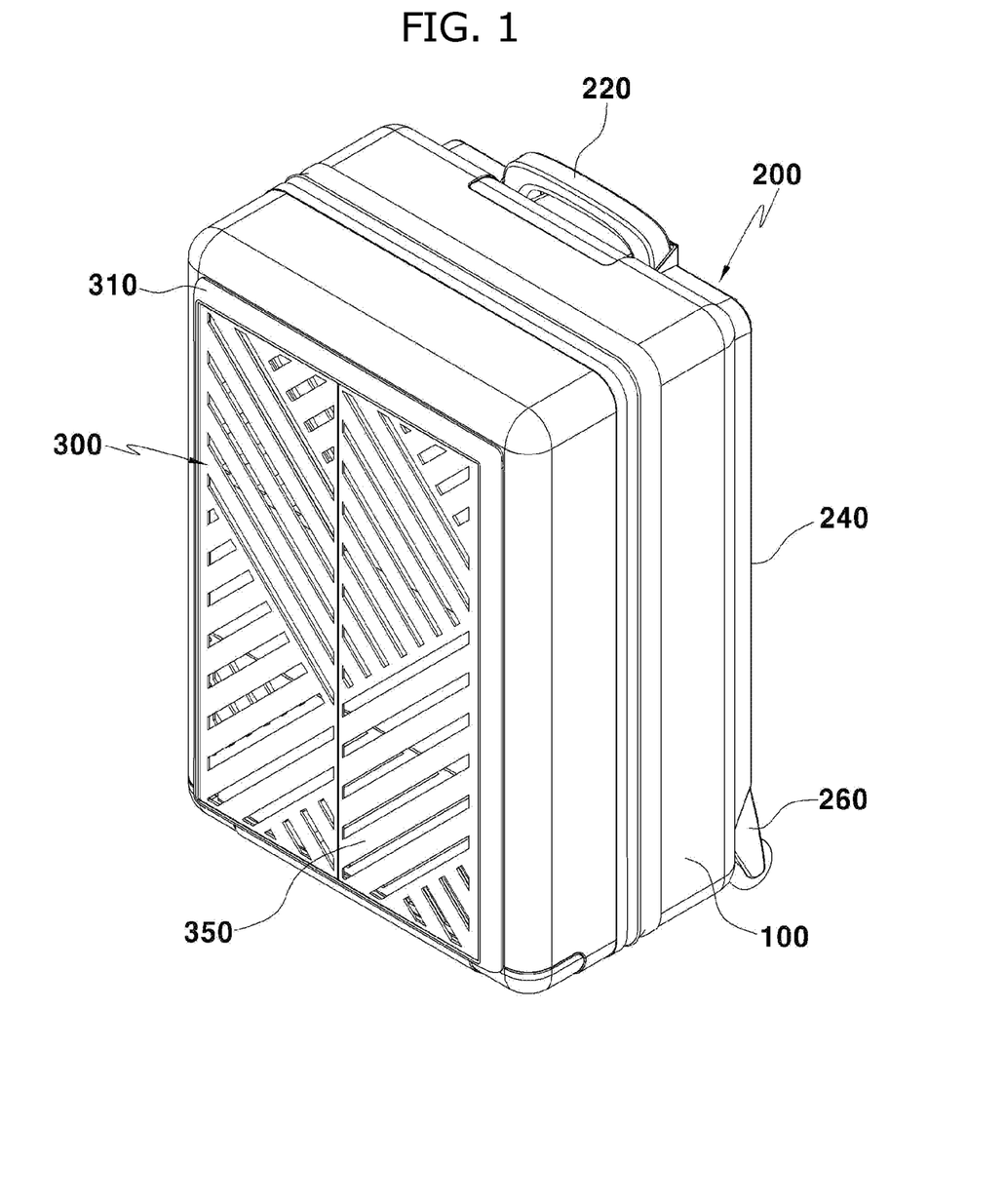
FIG. 1 is a perspective view showing a suitcase also usable as a wagon according to the present invention.
Figure 2:
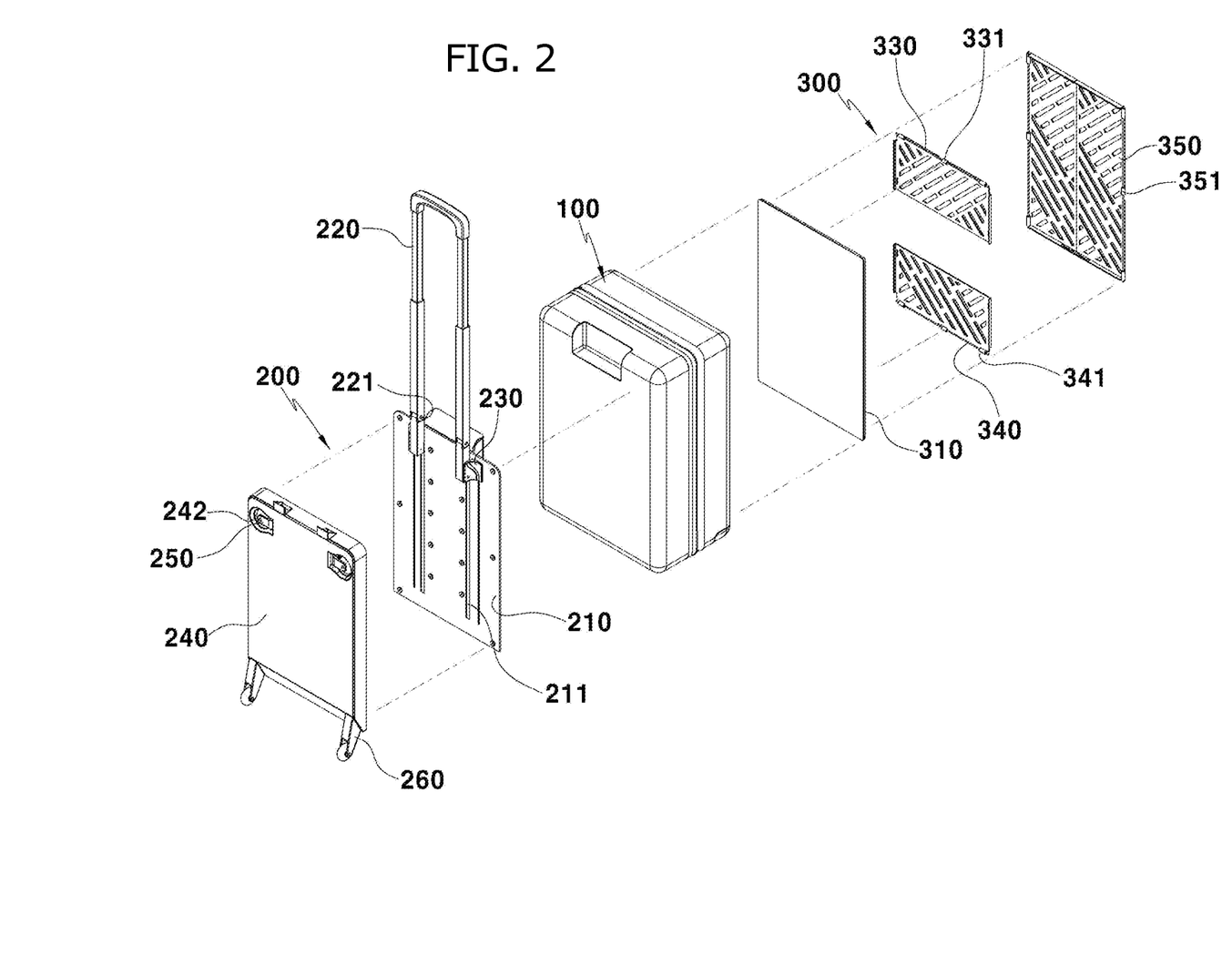
FIG. 2 is an exploded perspective view showing the suitcase also usable as a wagon according to the present invention.

The suitcase body 100 is made of a metal material such as aluminum or made of synthetic resin or fabric, is formed in a quadrangular shape, and is provided with a zipper or one-touch locking device along the center thereof so that the suitcase body 100 can be selectively opened and closed.

The auxiliary moving means 200 includes a base panel 210, a handle 220, a cover panel 240, and auxiliary castors 250.

Figure 3:
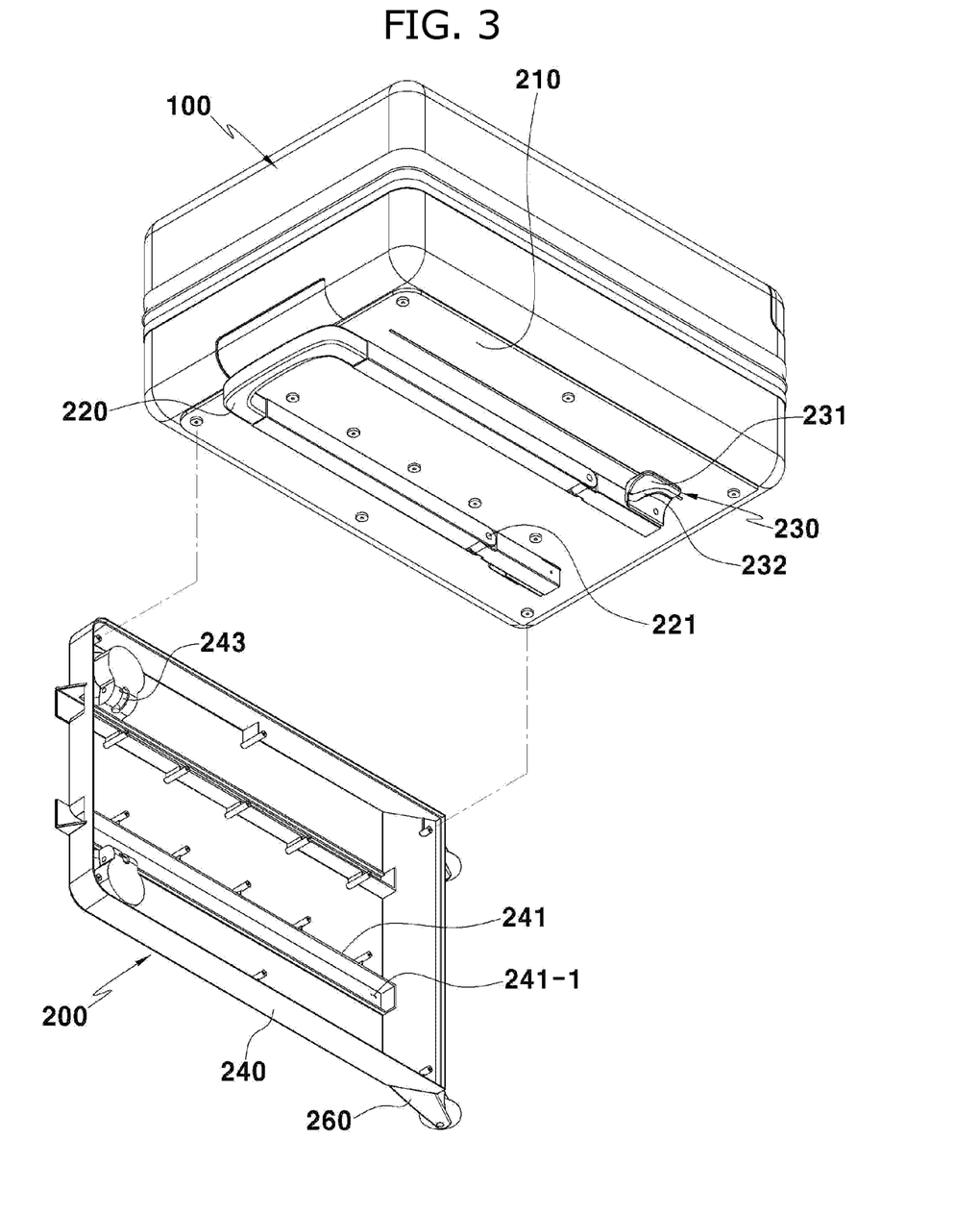
FIG. 3 is a view showing a state in which the handle shown in FIG. 2 is installed on a base panel.

The base panel 210 is installed on one side of the suitcase body 100 and fixed by a fixing means including rivets. Furthermore, support ribs 211 supporting the handle 220 are formed on the base panel 210 such that the handle 220 can be easily moved (or raised and lowered) in the state in which the cover panel 240 is coupled. The support ribs 211 are integrated with the base panel 210 in order to support the central portions of the parts that the handle 220 enters and exits.

The handle 220 is formed to be able to enter and exit between the base panel 210 and the cover panel 240 in one direction. Furthermore, the handle 220 is formed to have multiple stages so that the length thereof can be adjusted. Furthermore, the handle 220 is rotatably hinged at the lower side so that the angle of the handle 220 can be adjusted in the state in which the suitcase body 100 is laid down.

In addition, a castor entry/exit member 230 is installed at the lower end of the handle 220 to change the direction of the auxiliary castors 250.

Figure 6:
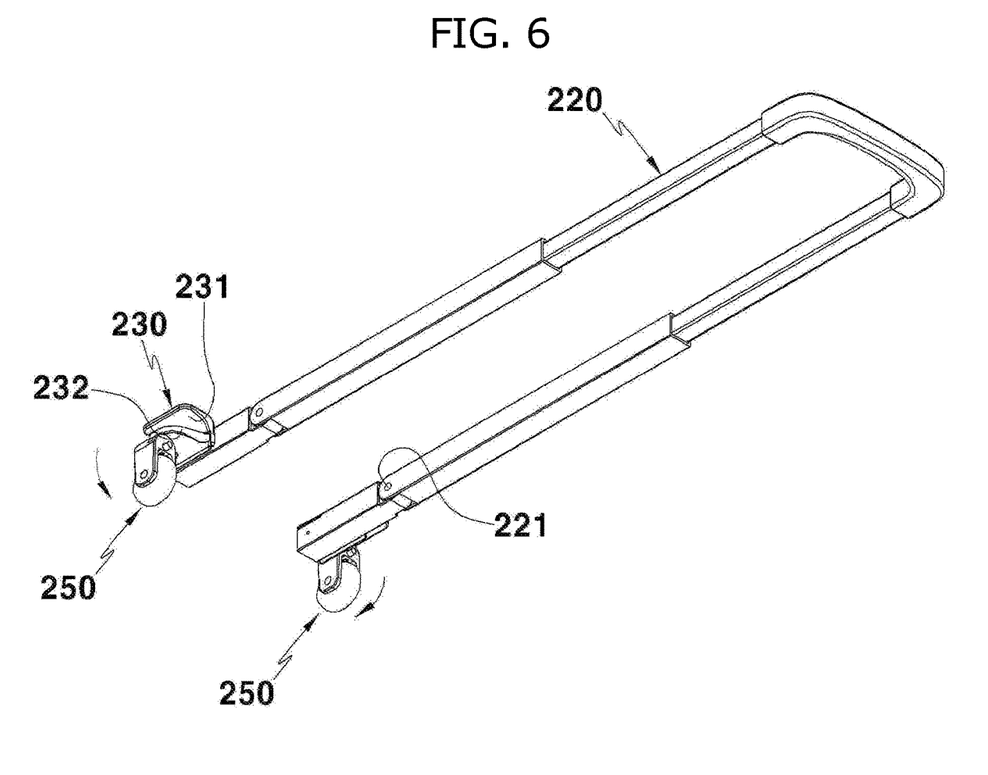
FIG. 6 is a view showing the state in which the directions of the auxiliary castors are changed by the castor input/output member while the handle shown in FIG. 2 is extended.

The castor entry/exit member 230 has a direction-changing body 231 having an 'F'-shaped cross section and a direction-changing groove 232 formed in a spiral shape on one side of the direction-changing body 231, so that the auxiliary castor 250 can selectively enter and exit the castor enter/exit groove 242 of the cover panel 240.

Figure 4:
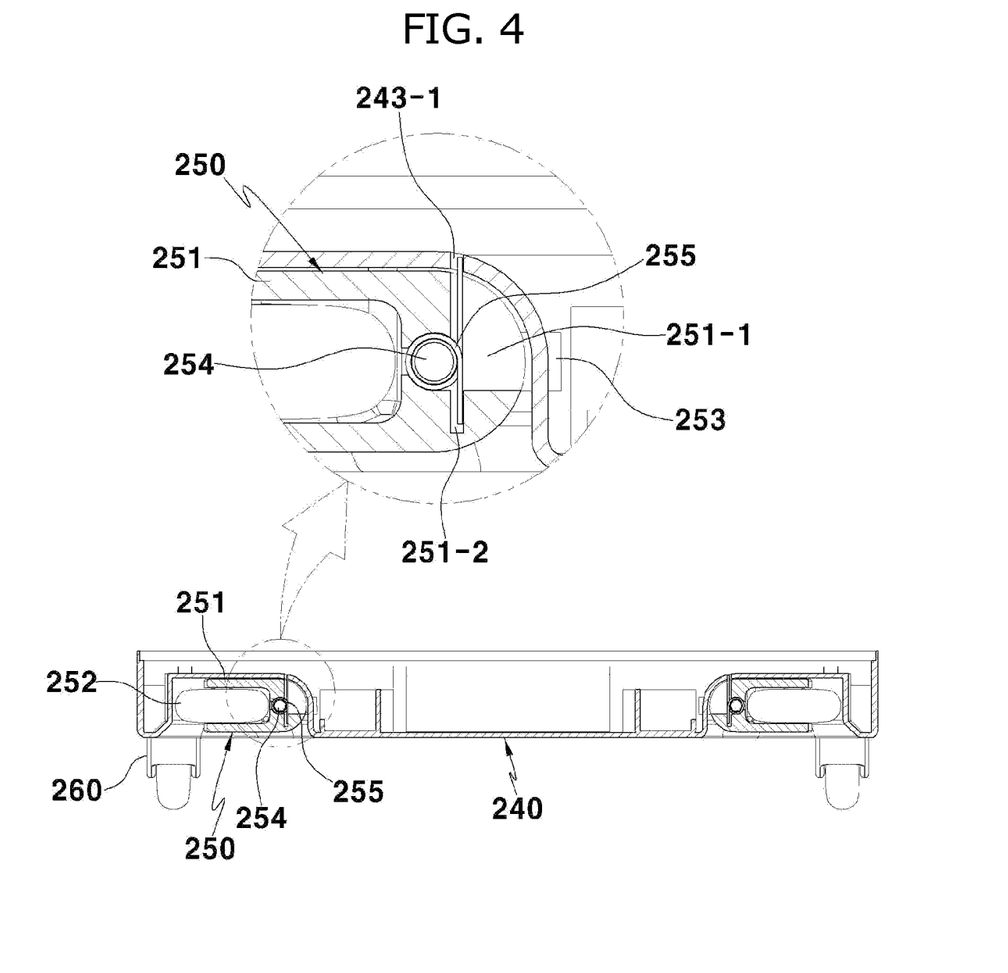
FIG. 4 is a view showing the state in which auxiliary castors are installed in the castor entry/exit depressions of a cover panel shown in FIG. 2.

The cover panel 240 is fixed to one side of the base panel 210. Guide protrusions 241 each having a guide groove 241-1 are formed on one side of the cover panel 240 to guide the handle 220 when the handle 220 selectively enters and exits.

The handle 220 is coupled inside the guide grooves 241-1, and is guided by the guide protrusions 241 when the handle 220 selectively enters and exits.

Figure 5:
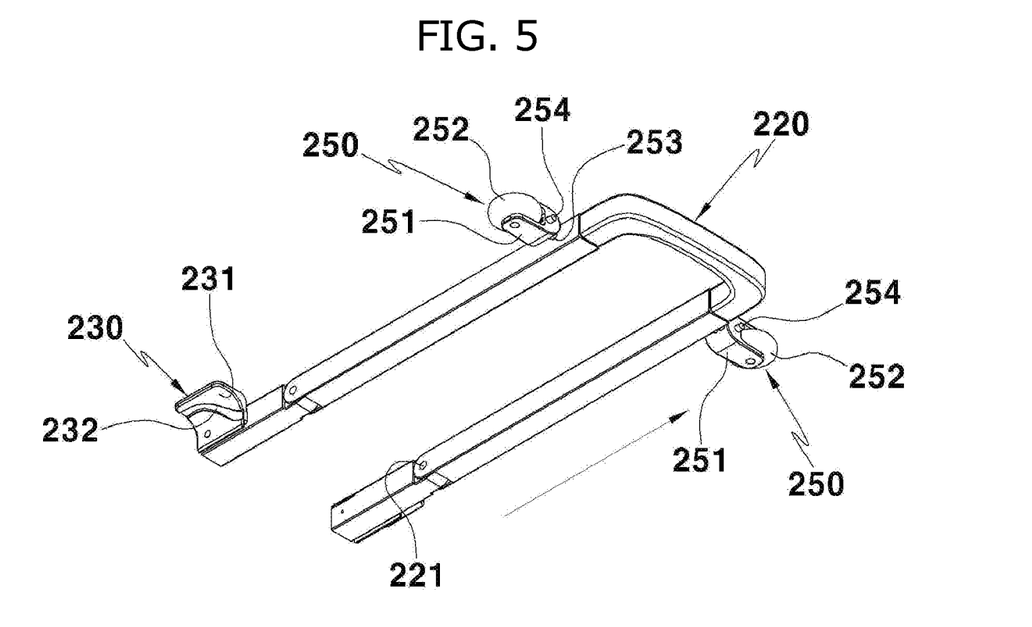
FIG. 5 is a view showing the state in which the auxiliary castors are retracted into the castor entry/exit depressions in the state in which the handle shown in FIG. 2 is retracted.

The castor entry/exit depressions 242 are formed on both sides of the upper portion of the cover panel 240 so that the auxiliary castors 250 can enter and exit them. Coupling holes 243 are formed through the castor entry/exit depressions 242 to be opposite to each other so that the rotating shafts 254 of the auxiliary castors 250 can be coupled thereinto. First spring support depressions 243-1 are formed to be connected to the coupling holes so that first sides of torsion springs 255 installed on the rotating shafts of the auxiliary castors 250 can be supported therein.

The auxiliary castor 250 includes: a wheel coupling member 251 formed in a '⋂' shape so that a wheel 252 can be coupled thereto and having a spring installation depression 251-1 and a second spring support depression 251-2 formed therein; the wheel 252 rotatably installed on the wheel coupling member 251; a direction-changing protrusion 253 coupled to the direction-changing depression 232 formed in a spiral shape in the castor entry/exit member 230, and configured to change the direction of the auxiliary castor 250; a rotating shaft 254 coupled to the coupling depression 243 formed opposite to the castor entry/exit depression 242, and formed in the wheel coupling member 251 so that the auxiliary castor 250 can be rotated by 90°; and the torsion spring 255 protruding into the spring installation depression 251-1, and coupled to the rotating shaft 254 so that one side thereof is supported by the first spring support depression 243-1 and the other side thereof is supported by the second spring support depression 251-2.

The torsion spring 255 is inserted into and supported in the spring installation depression 251-1 of the wheel coupling member 251, and the torsion spring 255 is coupled to the rotating shaft 254. The torsion spring 255 maintains the state in which the auxiliary castor 250 is retracted into the castor entry/exit depression 242.

In addition, in the state in which the auxiliary castor 250 is deployed by the castor entry/exit member 230, the torsion spring 255 has an action to be retracted into an initial state, i.e., the castor entry/exit depression 242, by an elastic action. Accordingly, in the state in which the castor entry/exit member 230 and the direction-changing protrusion 253 are separated from each other, they are retracted into the castor entry/exit depression 242.

In addition, castors 260 are installed on the lower portion of the cover panel 240 to facilitate movement when the suitcase of the present invention is used in the form of a suitcase or in a wagon style with the loading guide 300 set up.

The auxiliary moving means 200 configured as described above is installed on one portion of the inside or outside of the suitcase body 100. It is preferable that whether the auxiliary moving means 200 is installed on the inside or outside of the carry body 100 be determined depending on the addition of aesthetics to a product as well as a user's convenience or a means of transportation on which the suitcase body 100 is loaded.

Figure 7:
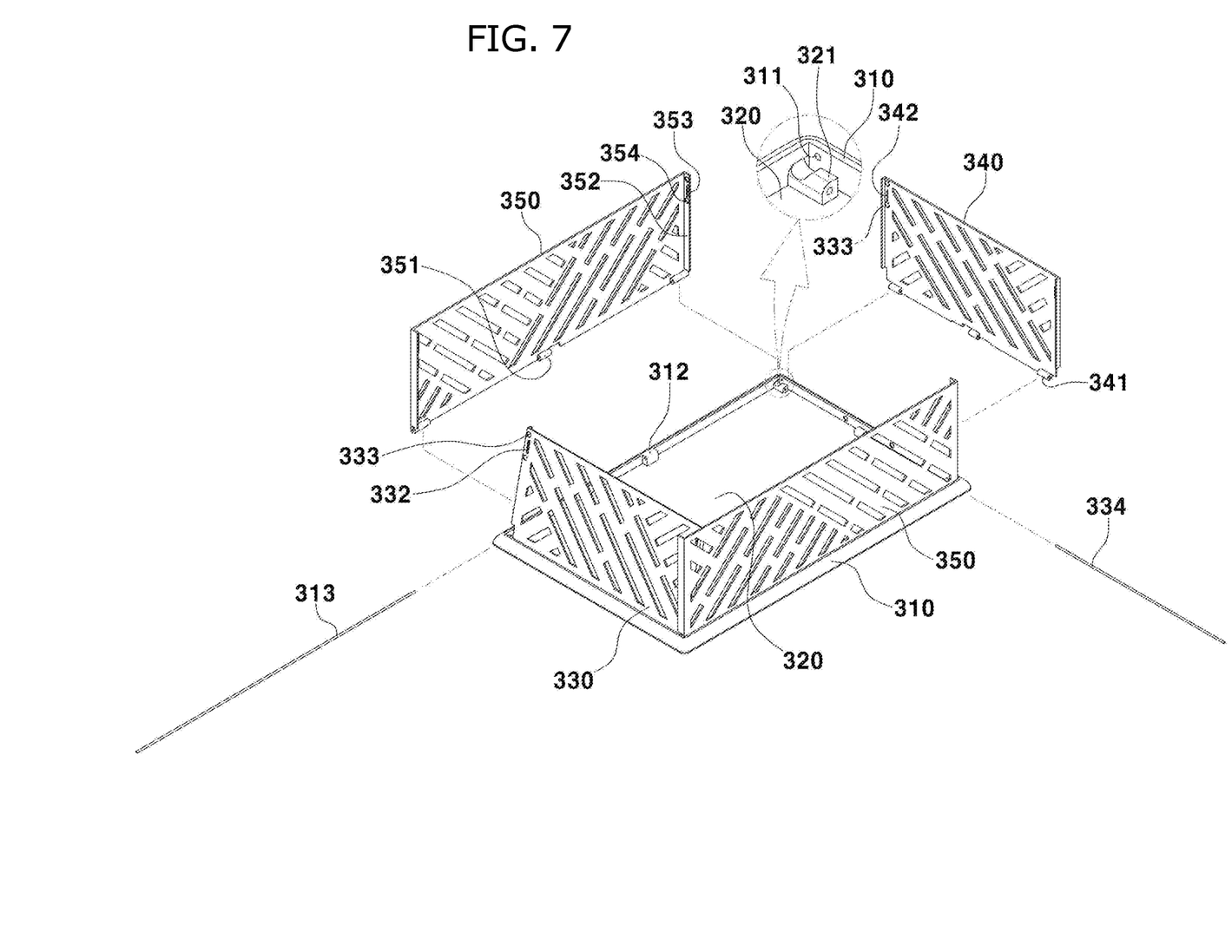
FIG. 7 is a perspective view showing only a loading guide installed on one side of the suitcase body shown in FIG. 2.

The loading guide 300 is installed on the side of the suitcase body 100 opposite to the size of the suitcase body 100 on which the auxiliary moving means 200 is installed, and has a folding form so that a load can be loaded thereonto while the suitcase body 200 is laid down.

The loading guide 300 includes a guide frame 310, a bottom panel 320, a front panel 330, a rear panel 340, and a plurality of side panels 350.

The guide frame 310 is integrated with the bottom panel 320, has a seating portion so that the front panel 330, the rear panel 340, and the side panels 350 are seated on the inside thereof in a folded state, and is fixed to the suitcase body 200. The bottom surface of the bottom panel 320 is located to be the same as the bottom surface of the guide frame 310.

In addition, the guide frame 310 is provided with fitting holes 311 into which first rotation pins 313 are inserted so that the plurality of side panels 350 can be combined with the first rotation pins 313 and folded.

A plurality of first fastening protrusions 312 are formed at the corners where the guide frame 310 and the bottom panel 320 meet so that the plurality of side panels 350 can be combined and folded, and the first fastening protrusions 312 are provided with respective first fastening holes (to which a reference symbol is not assigned) to which the first rotation pins 313 are coupled.

More specifically, at least two first fastening protrusions 312 are formed at the corners where the guide frame 310 and the bottom panel 320 meet in the portions where the plurality of side panels 350 are installed. The first fastening protrusions 312 are formed at both side ends of the corner portions to correspond to the third coupling protrusions 351 of the plurality of side panels 350.

In addition, second fastening protrusions 321 provided with second fastening holes are formed at the corners where the guide frame 310 and the bottom panel 320 meet in the portions where the front panel 330 and the rear panel 340 are located, and the second fastening protrusions 321 are formed to correspond to the first coupling protrusions 331 of the front panel 330 and the second coupling protrusions 341 of the rear panel 340.

The second fastening protrusions 321 are formed in a set of two at both sides of each of the corners where the guide frame 310 and the bottom panel 320 meet in the portions where the front panel 330 and the rear panel 340 are located, and are coupled to the first coupling protrusions 331 of the front panel 330 and the second coupling protrusions 341 of the rear panel 340 by the rotation pins.

The front panel 330 is installed to be foldable on one side of the top portion of the bottom panel 320. First coupling protrusions 331 each provided with a first coupling hole are formed on the bottom portion of the front panel 330 so that the second rotation pin 334 can be coupled to the first coupling holes, and the first coupling protrusions 331 include a plurality of first coupling protrusions 331 and are coupled to the first coupling protrusion 321 of the bottom panel 320 by the second rotation pin 334 so that the front panel 330 can be easily rotated.

First fixing depressions 332 are formed on both sides of the upper end of the front panel 330 and coupled with fastening protrusions 353 formed on the side panel 350, and are rotated to an unfolded state, i.e., by 90°, and maintain a fixed state to be perpendicular to the side panels 350.

Furthermore, first magnet coupling depressions 333 to which magnets are coupled are formed in the front panel 330, and magnets are installed in the first magnet coupling depressions 333 and attached to magnets installed on the side panels 350.

The rear panel 340 is installed to be foldable on one side of the bottom panel 320. Second coupling protrusions 341 each having a second coupling hole are formed at a lower portion of the rear panel 340 so that a third rotation pin (not shown) can be coupled thereto. The second coupling protrusions 341 include a plurality of second coupling protrusions 341 and are coupled with the first coupling protrusions 321 of the bottom panel 320 by the third rotation pin (not shown) so that the rear panel 340 can be easily rotated.

Second fixing depressions 342 are formed on both sides of the upper end of the rear panel 340 and coupled to the fixing protrusions 353 formed on the side panel 350, and are rotated to an unfolded state, i.e., by 90°, and maintain a fixed state to be perpendicular to the side panels 350.

In addition, second magnet coupling depressions 343 to which magnets are coupled are formed in the directions vertical to the places where the second fixing depressions 342 are formed. Magnets are installed in the second magnet coupling depressions 343 and attached to magnets installed on the side panels 350.

The side panels 350 include a plurality of side panels 350, are located in portions perpendicular to the front panel 330 and the rear panel 340, and are installed on both sides of the guide frame 310 to be foldable.

Third coupling protrusions 351 each having a third coupling hole are formed at the bottom ends of the plurality of side panels 350 so that the first rotation pins 313 can be coupled thereto. The third coupling protrusions 351 include a plurality of coupling protrusions 351, and the first rotation pins 313 are coupled to the formed fastening holes of the first fastening protrusions 312 so that the side panels 350 can be easily rotated.

In addition, bent protrusions 352 are formed at both ends of each of the side panels 350, respectively, and third magnet coupling depressions 354 in which magnets are installed such that they can be attached to the magnets installed in the first fixing depressions 333 and the second fixing depressions 342 are formed on the upper and lower sides of the bent protrusions 352.

In addition, the plurality of side panels 350 are installed to be inserted into the inside of the guide frame 310 so that they are located at the same height as the upper end of the guide frame 310 in a folded state.

In addition, the plurality of side panels 350 are folded to come into contact with each other at first ends thereof so that they are located on the front panel 330 and the rear panel 340. In the state of being in contact with each other, the folded state is fixed by a locking means (not shown) such as a depression and protrusion or a sliding lever.

The sliding lever is movably coupled to a depression on one side and is movable in a sliding manner, and the depression is formed in the other side panel 350 to correspond to the sliding lever.

The above configuration has been described as an example, and the locking means may be formed in various forms.

The bent protrusions 352 are formed at right angles on both sides of the plurality of side panels 350 and the fixing protrusions 353 are formed on the bent protrusions 352 so that they are coupled with the first fixing depressions 332 of the front panel 330 and the second fixing depressions 342 of the rear panel 340. As shown in the drawings, the panels are set up in a rectangular shape in a state in which one side thereof is open.

Figure 8:
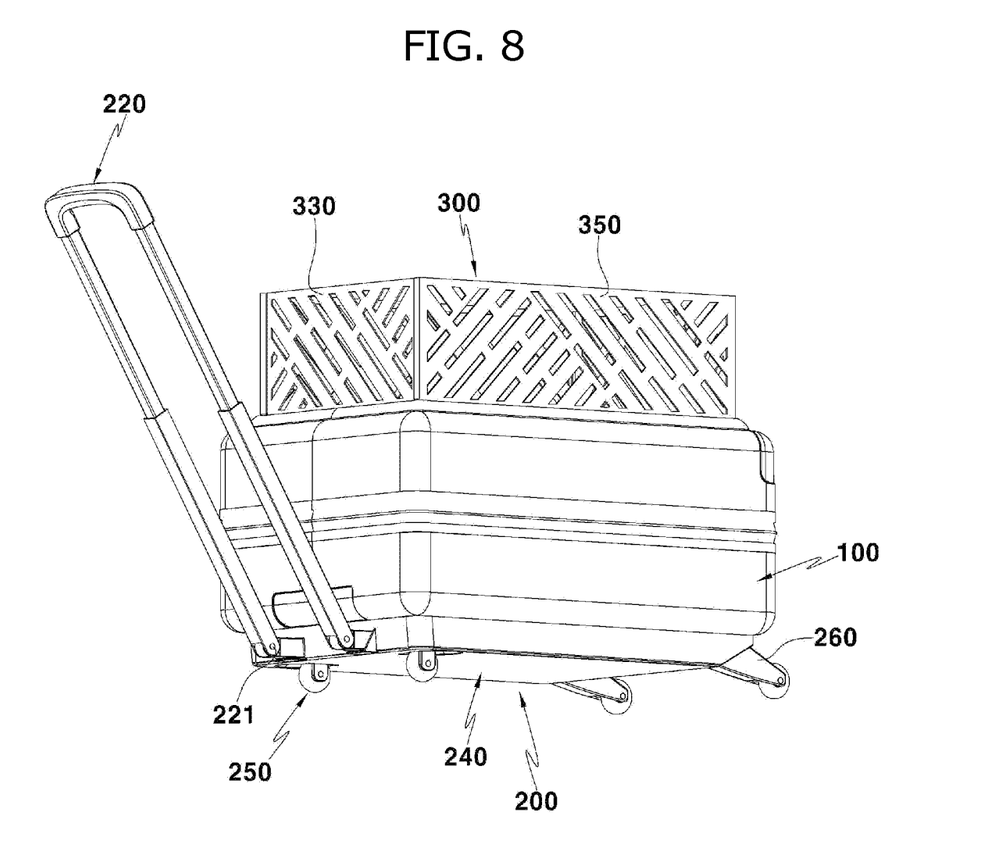
FIG. 8 is a use-state diagram showing a state in which the suitcase also usable as a wagon according to the present invention is used.

In order to load a load onto the loading guide 300 in the state in which the suitcase also usable as a wagon according to the present invention configured as described above is laid down, first, the direction-changing body 231 of the castor entry/exit member 230 installed at the bottom end is raised by extending the handle 220 of the auxiliary moving means 200 installed between the base panel and the cover panel as much as possible.

As the direction-changing body 231 is raised by the handle 220, the direction-changing protrusion 253 of the auxiliary castor 250 installed on the cover panel 240 is inserted into the direction-changing depression 232 formed in a spiral shape. The auxiliary castor 250 is rotated around the rotating shaft 254 by the direction-changing protrusion 253 whose position is changed by the direction-changing depression 232.

The auxiliary castor 250 rotating around the rotating shaft 254 protrudes outward from the cover panel 240. In this case, since the direction-changing protrusion 253 of the auxiliary castor 250 maintains the state of being coupled to the direction-changing depression 232 of the direction-changing body 231, the state in which the auxiliary castor 250 protrudes from the cover panel 240 is maintained.

In the state in which the auxiliary castor 250 protrudes from the cover panel 240, the handle 220 is extended such that the hinge shaft 221 is located in the upward direction of the base panel 210 and the cover panel 240. The handle 220 is rotated by a predetermined angle around the hinge shaft 221 to facilitate the movement of the suitcase body 100.

In other words, the angle of the handle 220 is adjusted according to the height of a user by the hinge shaft 221 in the state in which the suitcase body 100 is laid down, thereby making it easy to move the suitcase body 100.

As described above, in the state in which the auxiliary castor 250 is deployed by the extension of the handle 220, a user loads a load by unfolding the loading guide 300 installed on the suitcase body 100.

In order to set up the loading guide 300, the plurality of side panels 350 folded and overlapped on the tops of the front panel 330 and the rear panel 340 positioned in a folded state on the top of the guide frame 310 are placed in a vertical state by being rotated around the first rotation pin 313.

In the state in which the side panels 350 are erected vertically, the front panel 330 and the rear panel 340 are positioned in a vertical state by being rotated, and at the same time, the first fixing depressions 332 of the front panel 330 and the second fixing depressions 342 of the rear panel are respectively coupled to the fixing protrusions 353 formed on the side panel 350. Accordingly, the magnets installed in the first magnet coupling depressions 333 and the second magnet coupling depressions 334 are attached to the magnets installed in the third magnet coupling depressions 354 to be fixed, thereby being transformed into a wagon form.

As described above, in the state in which the suitcase body 100 is laid down such that it can be moved by the auxiliary moving means 200, the loading guide 300 is set up such that a load can be loaded. Accordingly, it has the advantage of being able to use both the features that only a suitcase has and the features that only a wagon has.

The above description of the present invention is intended for illustrative purposes, and those skilled in the art can understand that it can be easily modified into other specific forms without changing the technical spirit or essential features of the present invention. Therefore, the embodiments described above should be understood as illustrative and not limiting in all respects. For example, each component described as a single form may be implemented in a distributed manner, and similarly, components described as distributed may be implemented in a combined form.

The scope of the present invention is defined by the claims to be described later, and all changes or modifications derived from the meanings and scope of the claims and equivalent concepts thereof should be construed as being included in the scope of the present invention.

The invention claimed is:

1. A suitcase which is made of aluminum, synthetic resin, or fabric, is formed in a quadrangular shape, and is provided with a zipper or one-touch locking device along a center thereof so that a suitcase body (100) can be selectively opened and closed, and in which a handle is installed to be retractable on a top surface of the suitcase body, wherein:

an auxiliary moving means (200) configured such that auxiliary casters (250) are rotated and deployed by extension of a handle (220) is installed on the suitcase body (100) so that the suitcase body (100) can be laid down and moved;

a loading guide (300) is installed to be foldable on the suitcase body (100) so that a load can be loaded thereonto in a state where the suitcase body (100) is laid down;

the auxiliary moving means (200) comprises:
- a base panel (210) provided with support ribs (211);
- the handle (220) configured to be selectively retracted and extended while centers thereof are supported by the support ribs (211) and being guided by guide protrusions (241);
- a caster entry/exit member (230) installed on the handle (220), and configured to change directions of the auxiliary casters (250);
- a cover panel (240) provided with the guide protrusions (241) having guide depressions (241-1), and installed on one side of the base panel (210); and
- the auxiliary casters (250) configured to be selectively retracted into and deployed out of the base panel (210); and the auxiliary moving means (200) is installed on one of an inside or outside of the suitcase body (100).

2. The suitcase also usable as a wagon according to claim 1, wherein the castor entry/exit member (230) allows the auxiliary castors (250) to selectively enter and exit the cover panel by rotating the auxiliary castors (250) as the handle (220) selectively enters and exits between the base panel (210) and the cover panel (240).

3. The suitcase also usable as a wagon according to claim 1, wherein the castor entry/exit member (230) comprises: a direction-changing body (231) installed at a lower end of the handle (220); and a direction-changing depression (232) formed in the direction-changing body (231) in a spiral shape.

4. The suitcase also usable as a wagon according to claim 1, wherein the handle (220) is formed to have multiple stages so that a length thereof can be adjusted, and hinge shafts (221) are installed on lower sides of the handle (220) to enable angle adjustment.

5. The suitcase also usable as a wagon according to claim 1, wherein the auxiliary castor (250) comprises:
- a wheel coupling member (251) formed in a '∩', shape so that a wheel (252) can be coupled thereto, and having a spring installation depression (251-1) and a second spring support depression (251-2) formed therein;
- the wheel (252) rotatably installed on the wheel coupling member (251);
- a direction-changing protrusion (253) coupled to the direction-changing depression (232) formed in a spiral shape in the castor entry/exit member (230), and configured to change the direction of the auxiliary castor (250);
- a rotating shaft (254) coupled to the coupling depression (243) formed opposite to the castor entry/exit depression (242), and formed in the wheel coupling member (251) so that the auxiliary castor (250) can be rotated by 90°; and
- the torsion spring (255) coupled to the rotating shaft (254) so that sides thereof are supported by a first spring support depression (243-1) and the second spring support depression (251-2).

6. The suitcase also usable as a wagon according to claim 1, wherein the loading guide (300) comprises: a guide frame (310) integrated with the lower panel (320), and installed on one side of the suitcase body (100); and front, rear, and side panels (330, 340, and 350) installed to be foldable on a front, a rear and sides of the guide frame (310).

* * * * *